(12) United States Patent
Kalm

(10) Patent No.: US 6,286,660 B1
(45) Date of Patent: Sep. 11, 2001

(54) ROLLER CONVEYOR AND ROLLER SHAFT SUPPORT BRACKET

(75) Inventor: W. Scott Kalm, Plano, TX (US)

(73) Assignee: Key Handling Systems, Inc., Moonichie, NJ (US)

( * ) Notice: Subject to any disclaimer, the term of this patent is extended or adjusted under 35 U.S.C. 154(b) by 0 days.

(21) Appl. No.: 09/145,211

(22) Filed: Aug. 31, 1998

(30) Foreign Application Priority Data

Sep. 16, 1997 (JP) .................................................. 9-249255
Sep. 16, 1997 (JP) .................................................. 9-249256

(51) Int. Cl.⁷ .................................................. B65G 13/12
(52) U.S. Cl. .................. 198/782; 193/35 R; 198/781.06
(58) Field of Search .............................. 198/782, 781.06; 193/35 SS, 35 R

(56) References Cited

U.S. PATENT DOCUMENTS

| | | |
|---|---|---|
| 4,056,180 * 11/1977 | Gunti .................................. 193/35 J |
| 4,311,226 1/1982 | Thompson et al. . |
| 4,405,050 9/1983 | Fenton, Jr. et al. . |
| 4,444,301 * 4/1984 | Granberry .......................... 193/35 R |
| 4,693,356 9/1987 | Pi-May . |
| 5,040,669 * 8/1991 | Blocker ................................. 198/782 |
| 5,060,785 10/1991 | Garrity . |
| 5,129,507 7/1992 | Maeda et al. . |
| 5,137,145 8/1992 | Clopton . |
| 5,361,894 11/1994 | Solcz . |
| 5,372,247 12/1994 | Nishikawa . |
| 5,423,418 6/1995 | Furrow . |
| 5,447,224 9/1995 | Gebhardt . |
| 5,582,286 12/1996 | Kalm et al. . |
| 5,645,155 * 7/1997 | Houghton ........................... 193/35 R |
| 5,653,325 * 8/1997 | Enomoto ............................ 198/369.4 |
| 5,657,854 * 8/1997 | Chen et al. ........................... 198/787 |
| 5,678,676 * 10/1997 | Pierson ................................... 193/37 |
| 5,857,554 * 1/1999 | Toye .................................... 193/35 R |

* cited by examiner

Primary Examiner—Christopher P. Ellis
Assistant Examiner—Rashmi Sharma
(74) Attorney, Agent, or Firm—Jenkens & Gilchrist

(57) ABSTRACT

A substantially S-shaped side frame for a roller conveyor has a first duct section defining an exterior opening and a second duct section defining an interior opening. Necessary operating components, such as controllers, and associated wiring may be installed in the first duct section. Roller shaft support brackets are installed across the interior opening with a certain longitudinal pitch. The shafts of a plurality of laterally extending rollers are installed in through holes provided in the brackets to define a conveyor path for transporting articles. The brackets each include opposed slots for mounting to opposed rails for the second duct section. The opposed slots in the brackets include an inwardly tapered portion that allows the brackets to be rotatably inserted between the opposed rails. Each bracket may include one or more through holes for stably supporting the roller shafts. Each through hole is defined by a first through aperture (horizontal) and a second through aperture (vertically angled) that intersect in the bracket.

19 Claims, 15 Drawing Sheets

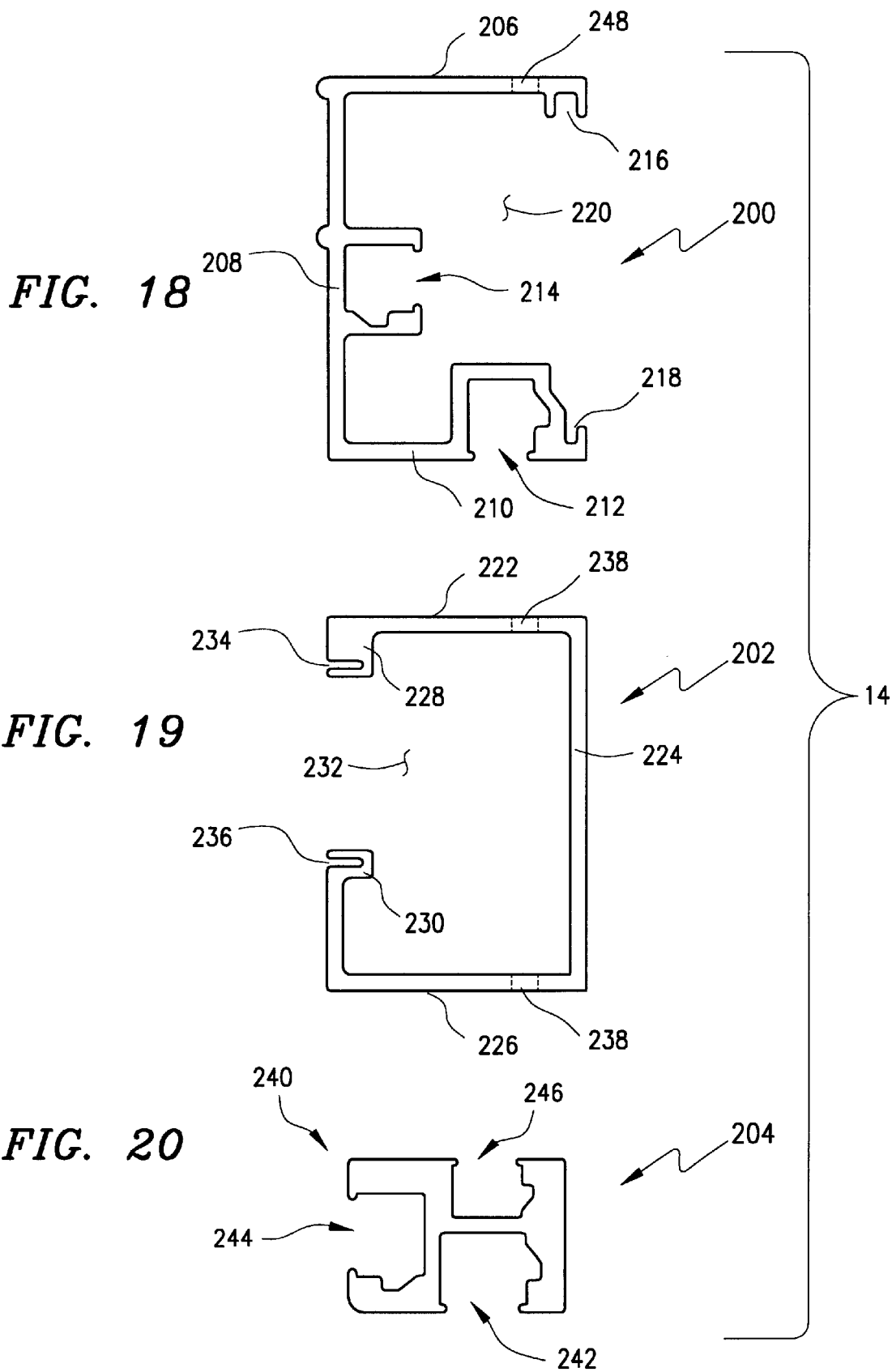

ROLLER CONVEYOR AND ROLLER SHAFT SUPPORT BRACKET

CROSS REFERENCE TO RELATED APPLICATIONS

This Application for patent claims priority from Japanese Patent Application No. 9-249255 (filed Sep. 16, 1997) and Japanese Patent Application No. 9-249256 (filed Sep. 16, 1997) entitled "Roller Shaft Support" by W. Scott Kalm, et al.

BACKGROUND OF THE INVENTION

1. Technical Field of the Invention

The present invention relate s to a roller conveyor of the type installed on a ceiling or floor or built into a shelf facility. The present invention further relates to a roller shaft support that is used for such a roller conveyor and that is slidable and point installable within a side frame of the roller conveyor.

2. Description of Related Art

U.S. Pat. No. 5,582,286 (issued Dec. 10, 1996 to Kalm, et al.) discloses a conventional prior art structure for a roller conveyor. In accordance with this conventional structure, a conveyor section is configured by providing a plurality of linear or tapered drive/transfer rollers supported by and extending between a pair of longitudinally extending side rail housings. Articles to be transferred by the conveyor section move along a conveyor path whose extent and direction is defined by the side rail housings and supported rollers.

Each conveyor section has at least one operating region. An article detection sensor mounted within the side rail housing in each operating region functions to sense an article transferred along the conveyor path and generate a detection signal indicative thereof. A conveyor controller responds to the detection signal and actuates the drive rollers to move the detected article in a controlled fashion along the conveyor path.

Each side rail housing is substantially C-shaped in cross-section to define an interior chamber within which conveyor controllers, controller wiring and article detection sensors are mounted. A removable cover may be mounted to the side rail housing over its exterior facing opening to enclose the interior chamber. Since the article detection sensors, conveyor controllers, and connection wiring are all provided within the interior chamber of the side rail housing, management of this inside space becomes a significant concern and problem. The provision of a substantial amount of wiring along with the necessary controller and sensor components crowds the interior chamber making maintenance and inspection difficult tasks to accomplish. There is a need for different roller conveyor side rail housing to support easy management and configuration of detection sensors, conveyor controllers, and connection wiring.

The article detection sensor used in the prior art is typically one of the photo sensor/reflector variety. When such an article detection sensor is mounted within the interior chamber of the prior art C-shaped side rail housing, an opening must be formed within the wall of the housing to allow a detection light beam to pass. In the event the conveyor section should ever be reconfigured, or if the operating region(s) should be changed, it is likely that the positioning of the article detection sensor may also need to be changed. This inconveniently requires that a new opening be formed in the wall of the housing. It further requires that the article detection sensor be remounted within the cramped confines of the interior chamber of the side rail housing. In sum, it is difficult to change detection position and operating regions in prior art conveyor structures.

Such laterally projecting photo sensor/reflector type article detection sensors do not always provide error-free detection. The light from the sensor must be projected all the way across the width of the conveyor section. In instances where the conveyor is especially wide, inconsistent reflection may occur giving rise to erroneous article detections. A need exists for an alternative mechanism for mounting photo sensor/reflector type article detection sensors to achieve more accurate detection operation and support easy changes in positioning the detector and reconfiguration of operating regions.

To mount the individual drive/transfer rollers to the side rail housings, holes are typically formed in the wall of the side rail housing into which the shafts of each roller are inserted. Generally speaking, the cross-sectional shape of each roller shaft is polygonal. More particularly, an octagonal shape is conventionally used, but other polygonal or elliptical cross-sectional shapes may alternatively be used. The hole formed in the wall of the side rail housing has a polygonal shape corresponding to that selected for the roller shaft. In order to allow for easy insertion and extraction of rollers from the side rail frame, the holes on at least one side of the conveyor must be slightly larger than the shaft. As will be discussed in more detail below, sizing of shaft openings in the side frames can present significant concerns.

To assist in the insertion process, the shaft on one end of each roller is spring loaded. The non-spring loaded shaft end of the roller is first inserted (at an angle to the conveyor path) into the slightly larger one of the holes in the side rail housing. The shaft on the opposite end of the roller is then loaded, and the roller is moved into position between the side rail housings. Once aligned with the hole on the opposite side rail housing, the spring loaded shaft is released, thus completing roller installation.

During operation of the roller conveyor, the drive rollers are intermittently actuated in order to control the transport of articles along the conveyor path. This intermittent actuation causes the roller shaft to rock back and forth within the slightly oversized hole in the side rail housing. With enough instances of actuation and rocking back and forth, a rounding off of the polygonal shape of either (or both) the roller shaft or the side rail housing hole occurs. Eventually, this leads to failure and a complete replacement of the side frame. A need exists for a more stable and failure resistant roller shaft mounting assembly.

The use of holes formed in the side rail housings to support the plurality of drive/transfer rollers fixes the position, pitch and orientation of the rollers along the conveyor path. Each reconfiguration of the rollers along the conveyor path undesirably may require the forming of new holes in an existing side rail housing. In more dramatic reconfigurations, the formation of the required number of new holes in an existing side rail housing may be too difficult to implement. Alternatively, such newly formed holes may weaken the structural integrity of the side rail housing. Replacement of the side rail housings then becomes the only alternative. It is thus recognized that the prior art roller conveyor structure does not support easy roller reconfiguration (such as to accommodate changes in pitch or changes in roller diameter).

Japanese Patent Application (laid-open) No. 7-117832 discloses a roller conveyor with a side rail housing configuration and mechanism supporting roller pitch change. In accordance with this roller conveyor configuration, a multi-pitch bracket is provided on supporting side frames in such a way that the bracket is slidable in the longitudinal direction along the supporting frames. When a desired position of the bracket is reached, the bracket may be fixed to the frame. Each bracket includes a section for fitting roller shafts. Thus, following fixation of the bracket to the frame at the desired position, individual drive or transfer rollers may be installed in the shaft-fitting sections of the brackets to define the conveyor path.

In the event an individual one of the brackets breaks or otherwise needs to be replaced or moved (for example, when a pitch change is required), all of the rollers from that bracket to an end of a conveyor section must be removed, and each of their associated brackets must be slid out of the frame. This is necessary in order to gain access to the individual bracket which has been designated for replacement. Following replacement of the designated bracket, the previously removed brackets are then reinstalled, and the removed rollers are again positioned in the brackets to re-define the conveyor path. A better frame and bracket assembly is needed to provide for less cumbersome roller conveyor production and maintenance activities.

Another difficulty of this prior art roller conveyor configuration is that the disclosed bracket is formed in such a way as to support only linear rollers. In the event tapered rollers are specified for use in the designed roller conveyor, a different (tapered roller specific) bracket must be installed. Thus, in order to fully support variability in roller conveyor design and configuration, multiple brackets must be produced and properly selected for installation. There is accordingly a need for a linear or tapered roller supporting bracket that may be installed, removed and replaced without affecting neighboring brackets.

SUMMARY OF THE INVENTION

The roller conveyor of the present invention includes a plurality of roller conveyor sections, each of which includes a conveyor frame defined by a longitudinally extending pair of side frames, a plurality of rollers supported between the pair of side frames, a plurality of photo sensor/reflector type article detection sensors, a programmable logic controller (PLC), a plurality of drive roller controllers (DRCs), and a plurality of drive units for actuating at least some of the rollers to transport articles along a conveyor path.

Each roller conveyor section is divided into a plurality of transfer areas or zones, each of which includes a plurality of the rollers, one of the article detection sensors, one of the DRCs per zone, and one of the drive units per zone. As the articles on the conveyor path pass through one of the transfer areas of the roller conveyor section, the articles are detected by the transfer area article detection sensor, which signals the roller conveyor section PLC, which activates the DRC for that transfer area, which in turn activates the transfer area drive unit, which then activates the transfer area rollers to transport the articles along the conveyor path of the roller conveyor section.

In a first embodiment of the present invention, each of the side frames has a generally S-shaped cross-section defining a first duct section and a second duct section. The first duct section opens outwardly in a direction away from the conveyor path and the second duct section opens inwardly in a direction towards the conveyor path. The controllers either are installed within the first duct section or are mounted under the conveyor section. Power for the controllers, as well as other wiring for interconnecting the controllers, may be run within the first duct section. A panel may be positioned to cover the outwardly directed opening comprising the first duct section, thus providing a more aesthetic side view presentation for the roller conveyor and further protecting the installed controller and wiring from damage.

In a second embodiment of the present invention, each of the side frames has a generally C-shaped cross-section defining a duct section. This duct section opens inwardly in a direction towards the conveyor path. The controllers are mounted to one of the side frames underneath the laterally extending rollers. Power for the controllers, as well as other wiring for interconnecting the controllers, may be run either within the duct section or through a conduit extending longitudinally along the conveyor path underneath the laterally extending rollers.

Each roller along the length of the conveyor path is supported between the pair of side frames by a corresponding pair of roller support brackets which are installed in (i.e., mounted to) the respective inwardly opening duct sections. The article detection sensor is installed on the roller conveyor, with the photo sensor mounted to one of the side frames underneath the laterally extending rollers and the reflector affixed to the other of the side frames above the laterally extending rollers such that the detection direction of the sensor is generally upward extending through a gap between adjacent rollers.

The opening in the side frame comprising the inwardly facing duct section is defined by an upper longitudinally extending rail member and an aligned lower longitudinally extending rail member. The roller support bracket includes a pair of opposed slots. When the bracket is installed into the inwardly facing duct section, an upper one of the opposed slots engages the upper rail member and a lower one of the opposed slots engages the lower rail member. Slight adjustments in the longitudinal positioning of the installed roller support bracket may be accomplished by sliding the bracket along the upper and lower rail members.

The pair of opposed slots in the roller support bracket are defined by a pair of opposed flat portions contiguous with a corresponding pair of opposed inwardly tapered portions. The inwardly tapered portions facilitate point of placement rotating installation of the roller support bracket. Thus, the roller support bracket may be angle inserted into the inwardly facing duct section at a selected point of placement. The opposed inwardly tapered portions of the pair of opposed slots are then aligned with upper and lower rail members. The roller support bracket may then be rotated into position through the inwardly tapered portions until the flat portion of the upper bracket slot engages the upper rail member and the opposed flat portion of the lower bracket slot engages the lower rail member.

Each roller support bracket includes a through hole into which a shaft of a roller is inserted and stably supported. The through hole is defined by a first through aperture having a substantially horizontal orientation and a second through aperture having an orientation that is vertically angled with respect to the horizontal orientation of the first through aperture. The orientations of the first and second through apertures are aligned with each other such that they intersect at a point located within the interior of the roller support bracket to define a central through hole portion having a size and shape substantially identical to (if not slightly smaller than) the size and shape of the roller shaft. Plural ones of such through holes are vertically positioned in each roller support bracket to support pitch changes and the installation of tapered rollers or rollers of differing diameters.

In yet another embodiment of the present invention, modular components are defined for use in assembling a side frame for a roller conveyor. One of the components comprises a substantially C-shaped component useful in providing side conveyor containment and providing a conduit for holding conveyor electrical equipment and wiring. A second one of the components comprises a substantially C-shaped component useful in mounting roller conveyor roller shaft support brackets. A third one of the components comprises a bar shaped component useful for providing structural support for the side frame and mounting the assembled side frame in suspended and floor configurations. Depending on the type of conveyor section being designed, only those necessary ones of the modular components are selected and assembled in forming the roller conveyor side frame.

BRIEF DESCRIPTION OF THE DRAWINGS

A more complete understanding of the method and apparatus of the present invention may be acquired by reference to the following Detailed Description when taken in conjunction with the accompanying Drawings wherein:

FIGS. 18–20 are cross-sectional views of certain modular frame components that may be selectively assembled to construct an alternative embodiment for a roller conveyor side frame.

DETAILED DESCRIPTION OF THE DRAWINGS

Figure 1:
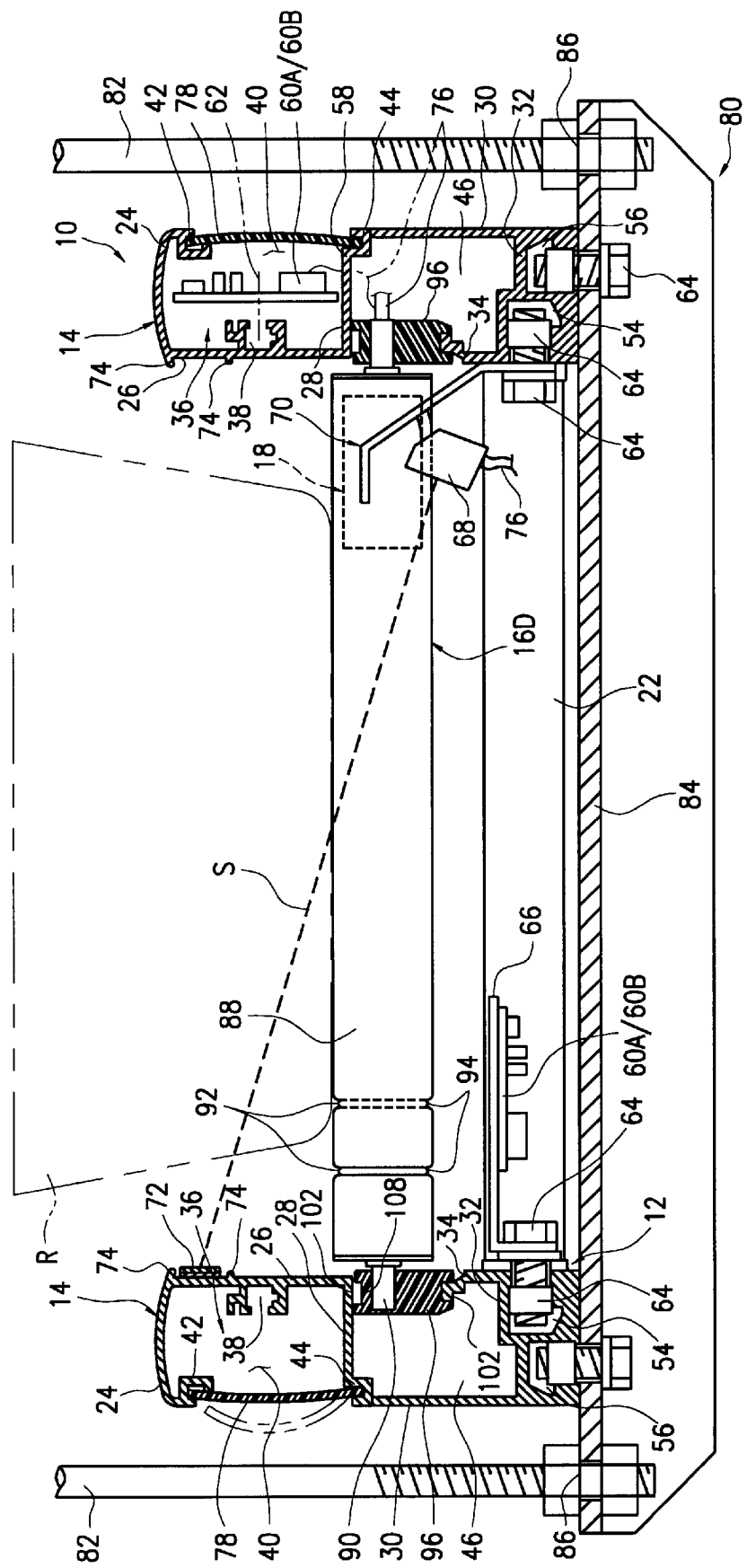
FIG. 1 is a lateral cross-sectional view of a roller conveyor.

Reference is now made to FIGS. 1–5 and 11–13 wherein there are shown several views of a first and second embodiments, respectively, of a roller conveyor section 10 in accordance with the present invention. The roller conveyor section 10 includes a conveyor frame 12 having a lateral pair of side frames 14 with a plurality of linear drive/transfer rollers 16 extending therebetween. Drive rollers 16d may be distinguished from transfer rollers 16t by the presence of an internal drive unit or motor 18. It will of course be understood that external (chain, gear, pulley, belt, or the like) drives may also be used. The rollers 16 define a conveyor path 20 along which articles (designated "R") are transported. The conveyor frame 12 further includes a lower frame 22 that connects the two side frames 14 together at a predetermined distance necessary to suitably support the laterally installed rollers 16. The conveyor path 20 is divided into a plurality of transfer areas or zones (generally indicated at "A" in FIG. 2) within each roller conveyor section 10.

Each side frame 14 is generally S-shaped (or reversed S-shaped) in cross-section. The side frame 14 of this configuration is preferably integrally formed by aluminum extrusion-molding or the like process in such a way as to have an identical cross section at any position in the longitudinal direction. The cross-sectional S-shape of the side frame 14 is defined by a horizontal roof portion 24 connected to an upper inner plate portion 26 which extends downward from the inner end of the roof portion 24. The cross-sectional S-shape of the side frame 14 is further defined by an intermediate horizontal plate portion 28 extending outward from the lower end of the upper inner plate portion 26 and oriented in parallel with the roof portion 24. The cross-sectional S-shape of the side frame 14 is still further defined by a lower outer plate portion 30 extending downward from the outer end of the intermediate horizontal plate portion 28 and oriented in parallel with the upper inner plate portion 26. The cross-sectional S-shape of the side frame 14 is still further defined by a bottom horizontal plate portion 32 extending inward from the lower end of the lower outer plate portion 30 and in parallel with the roof portion 24 and intermediate horizontal plate portion 28. The cross-sectional S-shape of the side frame 14 is still further defined by a lower inner plate portion 34 extending upward from the inner end of the bottom plate portion 32.

The roof portion 24, upper inner plate portion 26 and intermediate plate portion 28 define a first duct section 36 in the upper part of the side frame 14. A first dovetail groove portion 38 that is outwardly opened is formed in the first duct section 36 on the inner side of the upper inner plate portion 26. In addition, an exterior opening 40 for the first duct section 36 is formed between the outer ends of the roof portion 24 and intermediate plate portion 28. Groove-like locking sections 42 and 44 are formed at the outer ends of the roof portion 24 and intermediate plate portion 28, respectively, which portions form the exterior opening 40, in such a way that the groove-like locking sections 42 and 44 are opposed to each other.

The intermediate plate portion 28, lower outer plate portion 30, bottom plate portion 32 and lower inner plate portion 34 define a second duct section 46 in the lower part of the side frame 14. In addition, an interior opening 48 for the second duct section 46 is formed between the inner end of the intermediate plate portion 28 and the upper end of the lower inner plate portion 34. Slit grooves 50 and 52, that are each inwardly opened, are formed at the corner intersection point of the upper inner plate portion 26 and intermediate plate portion 28 and the upper edge of the lower inner plate portion 34, respectively. A second dovetail groove portion 54 that is inwardly opened is formed at the corner intersection point of the bottom plate portion 32 and lower inner plate portion 34. A third dovetail groove portion 56 that is downwardly opened is formed at the corner intersection point of the bottom plate portion 32 and lower outer plate portion 30.

In instances where the first duct section 36 and the upper inner plate portion 26 are not required in order for proper operation of the roller conveyor section 10, the roof portion 24 and upper inner plate portion 26 may be omitted from the side frame 14. In such a situation, the side frame will have a substantially C-shaped cross section defined by the intermediate plate portion 28, lower outer plate portion 30, bottom plate portion 32 and lower inner plate portion 34 for the second duct section 46. Mounting of the side frame and securing of the rollers 16 to the side frame is exactly the same as in this C-shaped configuration as with the S-shaped configuration illustrated in the FIGURES. See, for comparison, the modular components of FIGS. 19 and 20 which when assembled provide a substantially C-shaped side frame.

Figure 2:
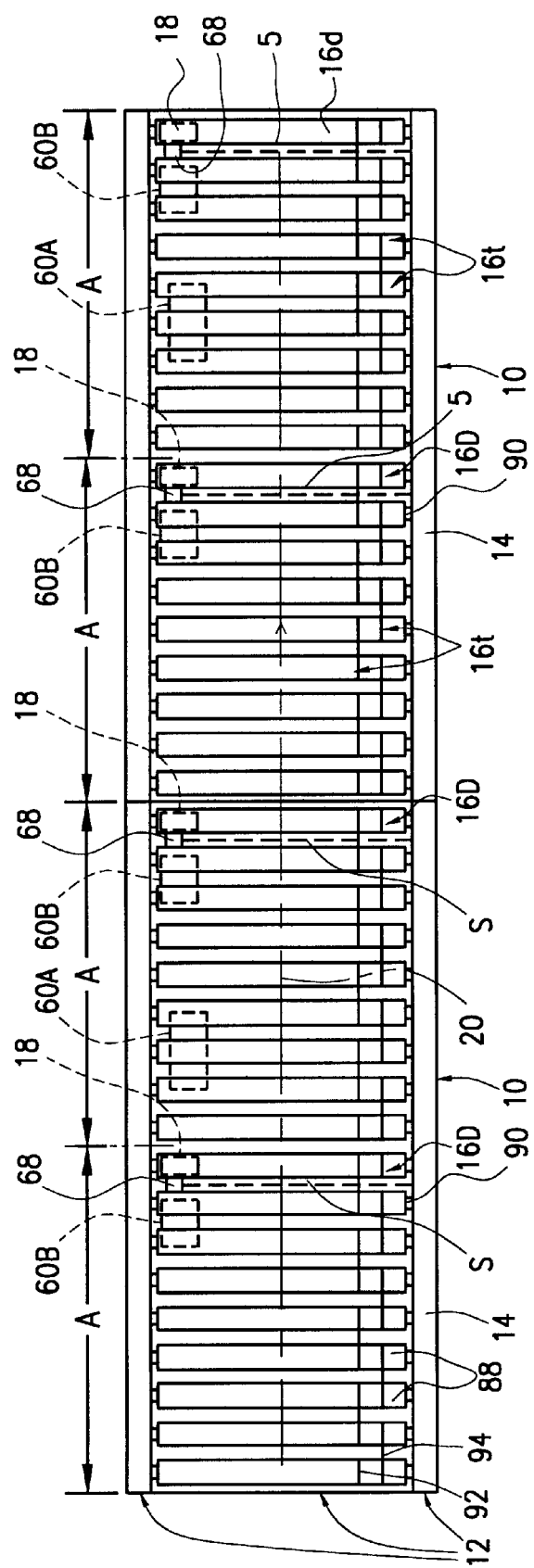
FIG. 2 is a plan view of the roller conveyor of FIG. 1.
Figure 3:
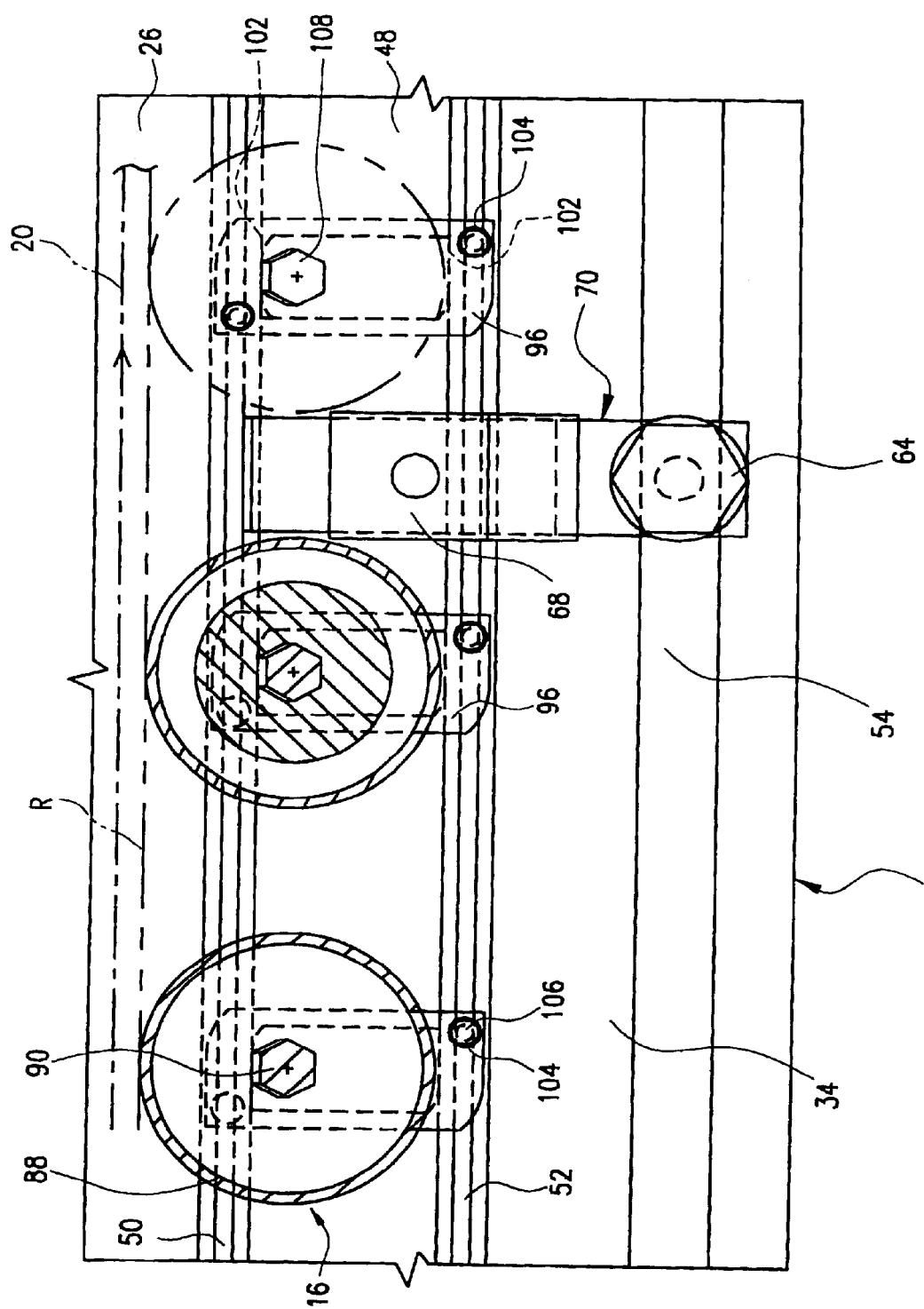
FIG. 3 is a partial longitudinal cross-sectional view of the roller conveyor of FIGS. 1 and 2.
Figure 4:
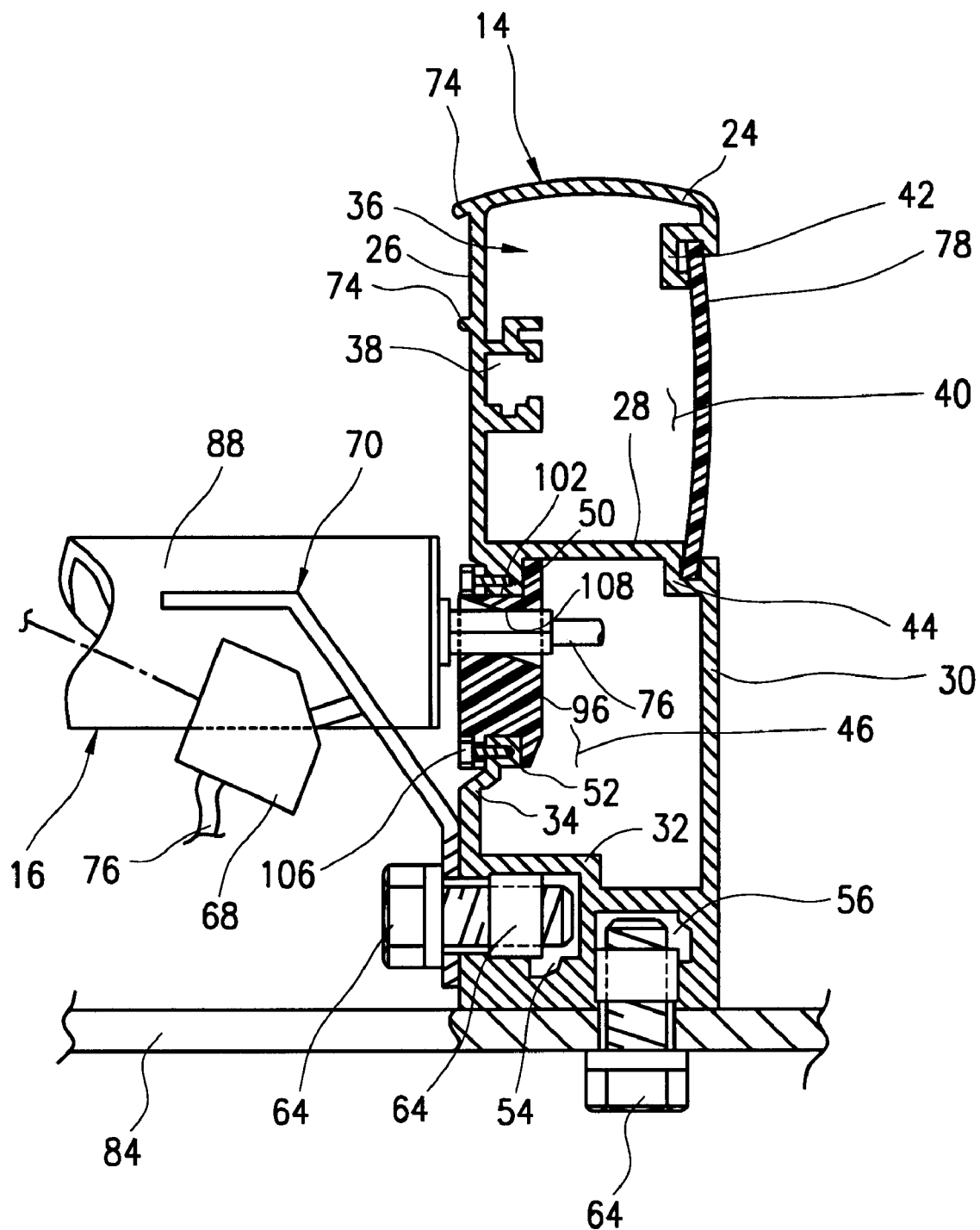
FIG. 4 is a partial lateral cross-sectional view of the roller conveyor of FIGS. 1–3.
Figure 5:
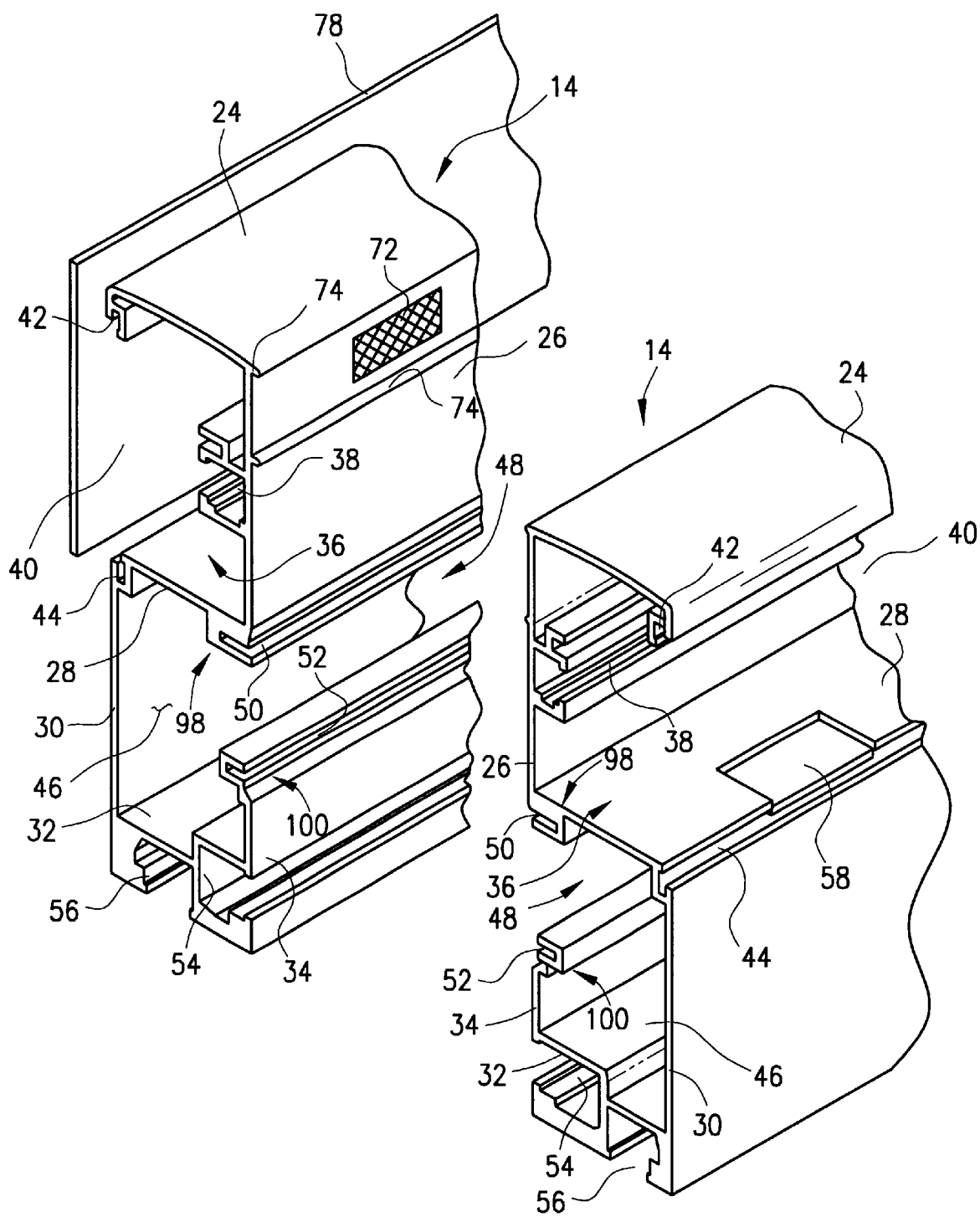
FIG. 5 is a perspective view of the side frames for the roller conveyor of FIGS. 1–4.

A programmable logic controller (PLC) 60A for the roller conveyor section 10 or a drive roller controller (DRC) 60B for the transfer area A may be installed in the first duct section 36. Using an appropriate fastener (schematically represented at 62), the controller 60A/60B is mounted on the inner surface side of the upper inner plate portion 26 using the first dovetail groove portion 38. This controller mounting operation can be easily performed from outside the roller conveyer through the exterior opening 40. Alternatively, the controller 60A/60B may be mounted underneath the rollers 16 of the roller conveyor section 10. For ease of illustration only, the controller 60A/60B is shown in FIG. 1 as being mounted on the opposite side of the conveyor from the motor 18 end of the rollers 16 (see, a more accurate placement of the controller 60A/60B as illustrated in FIG. 2). Using an appropriate nut and bolt fastener 64 and bracket 66, the controller 60A/60B is mounted to the bracket 66 and the bracket is mounted on the inner surface side of the lower inner plate portion 34 using the second dovetail groove portion 54. This controller 60A/60B mounting operation can be easily performed from underneath the roller conveyer.

A photo sensor/reflector type detector is also mounted to the side frames 14, and is operable to detect passage of a transferred article R along the conveyor path 20. The photo sensor part 68 of the detector is mounted (at the entrance to each transfer area A) underneath the rollers 16 of the roller conveyor section 10 to one of the side frames 14 using a bracket 70. One end of the bracket 70 is mounted on the inner surface side of the lower inner plate portion 34 using an appropriate nut and a bolt fastener 64 and the second dovetail groove portion 54, with the other end of the bracket 70 attached to the photo sensor part 68 and providing a cover to protect the sensor from damage inflicted by objects falling from the conveyor path and passing between adjacent rollers 16. Preferably, the photo sensor part 68 of the detector is mounted on the same side of the conveyor as the motor 18 end of the rollers 16. The reflector part 72 of the detector is affixed to the upper inner plate portion 26 of the side frame 14. The reflector preferably comprises a corner-type reflector. A pair of inwardly extending, longitudinal ridges 74 formed in the upper inner plate portion 26 (one positioned above the reflector part 72 and one positioned below) protect the reflector part from be damaged due to contact with articles R being transferred along the conveyor path 20. The photo sensor part 68 projects a beam of light (generally indicated at "S") aimed at the reflector part 72 and passing between two adjacent rollers 16. When an article R is not passing by, the beam of light S is returned by the reflector part 72 to the photo sensor part 68 and detected. When an article R does pass by, the beam of light S is blocked by the passing article and the lack of light is detected by the photo sensor part 68. An appropriate signal indicative of article R detection is generated by the photo sensor part 68 for communication to the PLC 60A.

In operation of the roller conveyor, when a sensor 68 detects the presence of a transferred article R at the entrance to the transfer area A, the sensor 68 sends an article detection signal to the PLC 60A within the roller conveyor section 10. The PLC 60A sends a signal to the DRC 60B within the transfer area A for that sensor. The DRC 60B selectively activates the motor 18 in a roller 16 located within the transfer area A for that sensor to control movement of the transferred article R. This allows for sequential transfer of the article R from one transfer area A to a next transfer area.

At periodic intervals along the longitudinal length of the side frame 14, a pass-through opening 58 is formed in the intermediate plate portion 28 between the first duct section 36 and second duct section 46. This opening 58 allows for the passage of wiring between the first duct section 36 and second duct section 46. More particularly, in instances where the controller 60A/60B is mounted within the first duct section 36, wiring 76 extending between the controller and motor 18, and further extending between the controller and the photo sensor part 68 passes through the opening 58. Other wiring (not shown) such as for a power bus and a communications bus may be installed in either the first duct section 36 or second duct section 46 passing, as is required, through the opening 58. In instances where the controllers 60A/60B are mounted beneath the rollers 16 of the roller conveyor section 10 and the wiring is installed in the second duct section 46, opening 58 is not required, resulting in the further reduction in fabrication costs and the increase in strength of the side frame 14.

The exterior opening 40 for the first duct section 36 is closed by a flexible cover 78 comprising, for example, a synthetic resin panel. This closed position is maintained by elastic recovery force effected when the upper and lower edges of the cover 78 are fitted in the opposed groove-like locking sections 42 and 44. The cover 78 can be detached from the side frame 14 by flexing it against its elasticity to remove the upper and lower edges from the groove-like locking sections 42 and 44, as shown by the imaginary line in FIGS. 1 and 11.

As mentioned previously, the roller conveyor is formed of a number of aligned and interconnected conveyor sections 10. During installation of the conveyor, a number of these sections 10 must assembled together and arranged in such a way that the conveyor path 20 is longitudinally extended. Adjacent roller conveyer sections 10 are coupled together by coupling plates (not shown) which are secured across the joints between adjacent sections using an appropriate nut and a bolt fastener 64 which secures the coupling plates to the side frames 14 at the first dovetail groove portion 38, second dovetail groove portion 54 and/or third dovetail groove portion 56. Furthermore, the side frame 14 is coupled to the lower frame 22 by using an appropriate nut and a bolt fastener 64 mounted in the second dovetail groove portion 54.

The roller conveyor of this configuration is supported from the ceiling via a hanging apparatus 80. Hanging rods 82 (located outside of each side frame 14) hang the roller conveyor from the ceiling. A supporting frame 84 is coupled between the bottoms of the hanging rods 82 using a coupling device 86. Adjustments may be made to the coupling device to make adjustments to the height of the supporting frame 84. Each roller conveyor section 10 is placed on and supported by the supporting frame 84. Furthermore, the side frames 14 are secured to the supporting frame 84 by using an appropriate nut and a bolt fastener 64 mounted in the third dovetail groove portion 56. Although illustrated as having a suspended installation configuration, it will of course be understood that the roller conveyor may alternatively utilize a floor installation. In such a configuration, legs (not shown) may replace the hanging rods 82, or alternatively be mounted directly to the side frames 14 by using an appropriate nut and a bolt fastener 64 mounted in the third dovetail groove portion 56.

Each of the linear rollers 16 is comprised of a roller cylinder 88. A roller shaft 90 is rotatably mounted at each end of the roller cylinder 88 using a bearing (not shown). The roller shaft 90 at one end of each linear roller 16 is spring loaded. Thus, by applying pressure this shaft may be pushed into roller cylinder 88. As mentioned above, certain ones of the rollers 16 include a motor 18 for rotating the roller cylinder 88 about the roller shaft 90. Preferably, the spring loaded roller shaft 90 is located at the opposite end of the roller 16 from the motor 18. An annular recess 92 is formed in the roller cylinder 88 at two locations near one end (for example, the spring loaded roller shaft 90 end) of the linear roller 16. A round belt 94 is passed around the annular recesses 92 of adjacent rollers 50 in order to transmit rotational force between the rollers. Thus, a single linear (drive) roller 16 including a motor 18 may be used to drive, through the belts 94, a plurality of other (transfer) rollers.

A plurality of roller shaft support brackets 96 are mounted at selected locations to each of the side frames 14. An upper rail member 98 is positioned at the inner end of the intermediate plate portion 28, and includes the slit groove 50. A lower rail member 100 is positioned at the upper end of the lower inner plate portion 34, and includes the slit groove 52. Each roller shaft support bracket 96 is installed in the interior opening 48 for the second duct section 46 between the upper rail member 98 and the lower rail member 100.

The roller shaft support bracket 96 includes an opposed pair of slots 102 which engage the upper rail member 98 and the lower rail member 100 when the bracket is installed in the interior opening 48. Once installed, the bracket 96 may be slid longitudinally along the side frame 14 in order to make adjustments to its position (perhaps relative to a corresponding bracket mounted in the other side frame, or as needed to change roller pitch), or it may be removed and replaced. The bracket 96 includes a pair of diagonally opposed openings 104 that align with the slit grooves 50 and 52 when the bracket is installed in the interior opening. Once a final positioning of the bracket 96 has been determined (in accordance with pitch requirement and with tightening of the belts 94), a tap screw (or other securing means) 106 may be passed through each of the openings 104 and tightened to lock the bracket into place. It will of course be understood that if the size of the opening 48 in each side frame 14 is sufficient, dovetail grooves may be formed (alternatively to the slit grooves 50 and 52) in the upper rail member 98 and the lower rail member 100, and the bracket 96 may be fastened to the side frame 14 using an appropriate nut, bolt, and fastener 64.

The linear rollers 16 are supported to extend between the side frames 14 using a pair of brackets 96 mounted opposite each other in the interior openings 48. Each bracket 96 includes a through hole 108 into which the roller shaft 90 of the roller 16 is inserted and stably supported. By making appropriate adjustments in the positioning of the brackets 96, as well as the use of belts 94 having an appropriate length, the plurality of rollers 16 may be disposed at a desired pitch in the longitudinal direction of the side frames 14.

Figure 6:
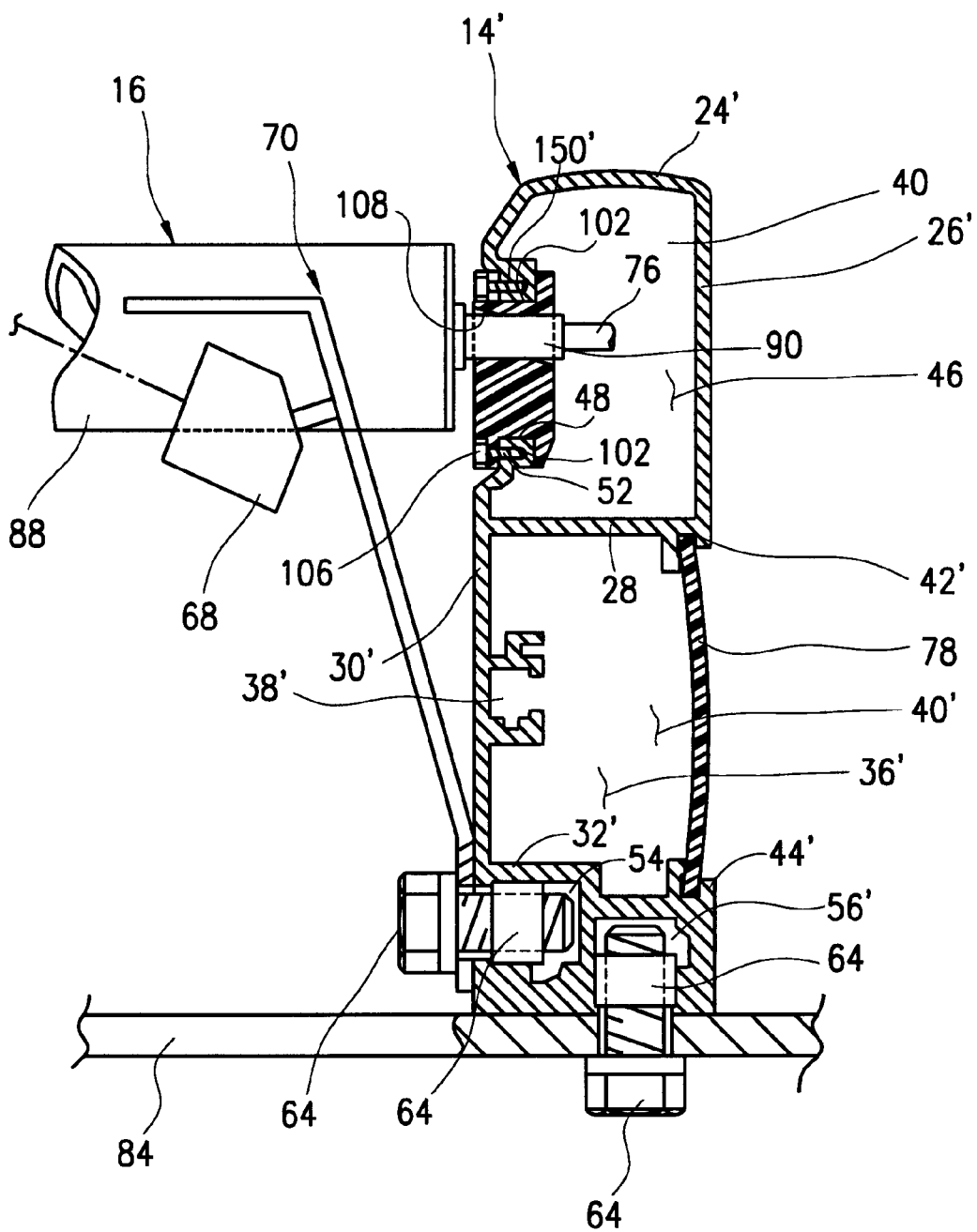
FIG. 6 is a partial lateral cross-sectional view of an alternate side frame configuration for the roller conveyor.

Reference is now made to FIG. 6 wherein there is shown a partial lateral cross-sectional view of an alternate side frame 14' configuration for the roller conveyor. Each side frame 14' is generally S-shaped (or reversed S-shaped) in cross-section. The cross-sectional S-shape of the side frame 14' is defined by a horizontal roof portion 24' connected to an upper outer plate portion 26' which extends downward from the inner end of the roof portion 24'. The cross-sectional S-shape of the side frame 14' is further defined by an intermediate horizontal plate portion 28' extending outward from the lower end of the upper outer plate portion 26' and oriented in parallel with the roof portion 24'. The cross-sectional S-shape of the side frame 14' is still further defined by a lower inner plate portion 30' extending downward from the inner end of the intermediate horizontal plate portion 28' and oriented in parallel with the upper outer plate portion 26'. The cross-sectional S-shape of the side frame 14' is still further defined by a bottom horizontal plate portion 32' extending outward from the lower end of the lower inner plate portion 30' and in parallel with the roof portion 24' and intermediate horizontal plate portion 28'.

The intermediate plate portion 28', lower inner plate portion 30' and bottom plate portion 32' define a first duct section 36' in the lower part of the side frame 14'. A first dovetail groove portion 38' that is outwardly opened is formed in the first duct section 36' on the outer side of the lower inner plate portion 30'. In addition, an exterior opening 40' for the first duct section 36' is formed between the outer ends of the intermediate plate portion 28' and the bottom plate portion 32'. Groove-like locking sections 42' and 44' are formed at the outer ends of the intermediate plate portion 28' and the bottom plate portion 32', respectively, which portions form the exterior opening 40', in such a way that the groove-like locking sections 42' and 44' are opposed to each other. The roof portion 24', upper outer plate portion 26' and intermediate plate portion 28' define the second duct section 46' in the upper part of the side frame 14'. In addition, an interior opening 48' for the second duct section 46' is formed between the inner ends of the roof portion 24' and intermediate plate portion 28'. Slit grooves 50' and 52', that are each inwardly opened, are formed at the inner edge of the roof portion 24' and near the corner intersection point of the intermediate plate portion 28' and the upper edge of the lower inner plate portion 30', respectively. A second dovetail groove portion 54' that is inwardly opened is formed at the corner intersection point of the bottom plate portion 32' and lower inner plate portion 30'. A third dovetail groove portion 56' that is downwardly opened is formed in the bottom plate portion 32'.

Reference is now made to FIGS. 7–10 wherein there are shown perspective and cross-sectional views of the roller shaft support bracket 96 for the roller conveyor. In these views, "H" refers to a height dimension, "T" refers to a thickness dimension, and "W" refers to a width dimension. The bracket 96 includes an opposed pair of slots 102 extending in the width direction. The slots 102 in the roller shaft support bracket 96 are positioned at the top and bottom of the bracket, and are defined by a pair of opposed flat (straight) slot portions 110 contiguous with a corresponding pair of opposed inwardly tapered (in the height direction) slot portions 112. The inward taper for the slot portions 112 is preferably a curved (e.g., arcuate or parabolic) taper, but a linear taper of appropriate slope may also be used. The bracket 96 includes a pair of diagonally opposed, corner positioned, openings 104 extending in the thickness direction and positioned on each side of the bracket.

The bracket 96 still further includes at least one through hole 108 for stably supporting a roller shaft (not shown) of a roller (not shown). A single through hole 108 bracket 96 is shown installed in a roller conveyor in FIGS. 1, 3, 4 and 6. A double through hole 108 bracket 96 (like that specifically illustrated in FIGS. 7–10) is shown installed in a roller conveyor in FIGS. 11–13 and 15–17. Although one and two hole brackets 96 are illustrated, it will of course be understood that three or more through holes 108 (in the height direction) may be formed in each bracket 96 if needed and if permitted by the size of the interior opening 48 of the side frames 14.

Figure 9:
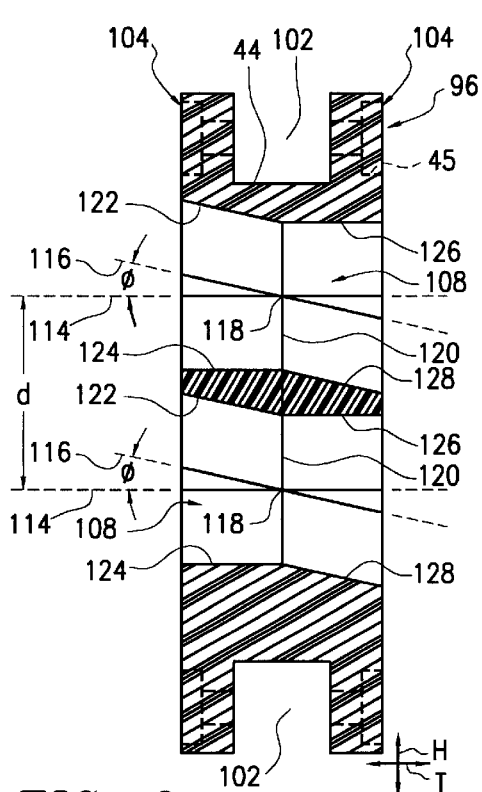
FIGS. 9 and 10 are cross-sectional views of the roller shaft support bracket of FIGS. 7 and 8 taken along lines 9—9 and 10—10, respectively.
Figure 10:
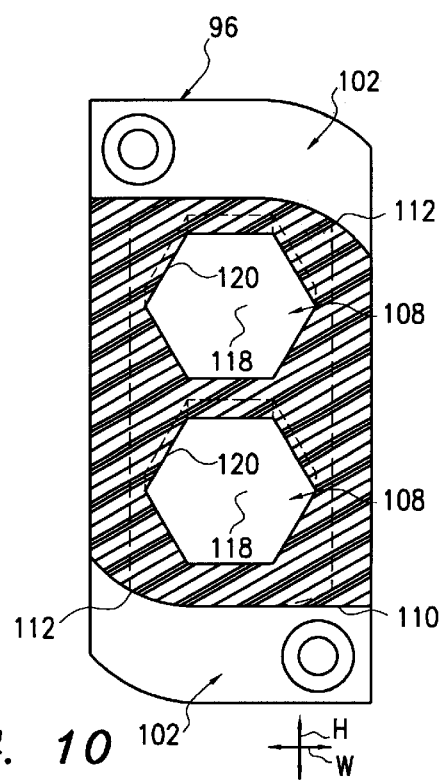
Figure 7:
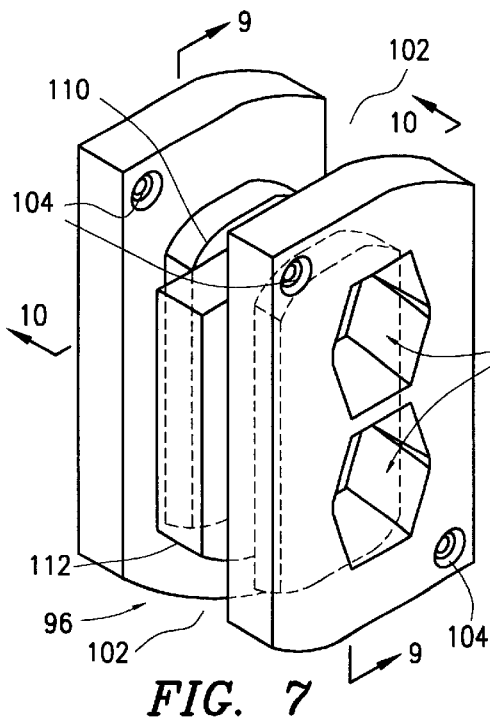
FIGS. 7 and 8 are perspective views of a roller shaft support bracket for the roller conveyor.
Figure 8:
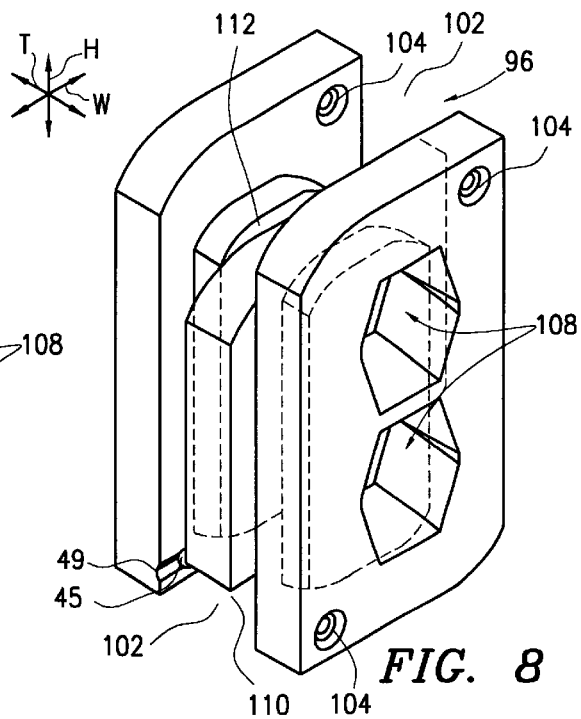
Figure 11:
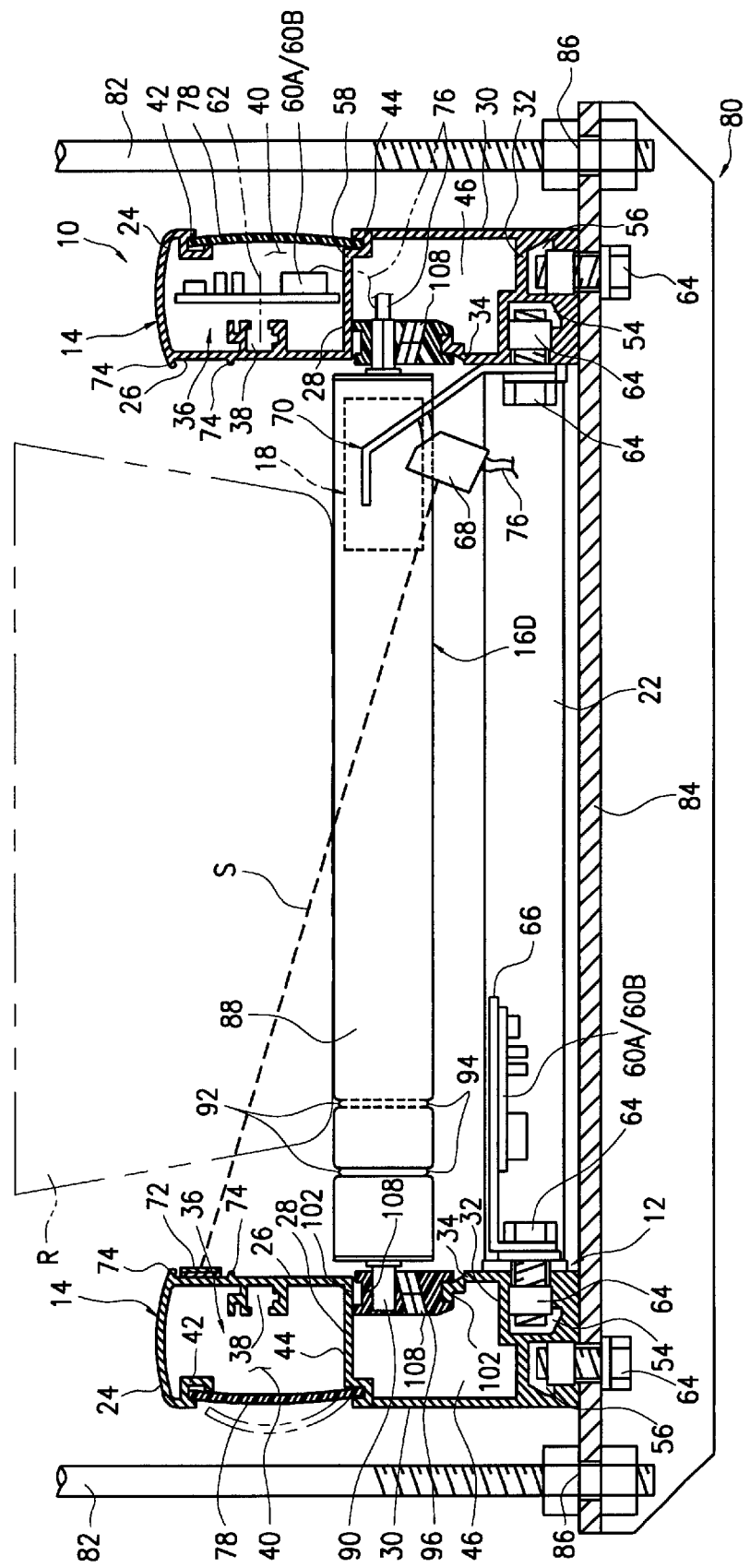
FIG. 11 is a lateral cross-sectional view of the roller conveyor illustrating use of the roller shaft support brackets of FIGS. 7–10 to support the installation of linear rollers.

With specific reference now to FIG. 9, the through hole 108 is defined by a first through aperture having a substantially horizontal orientation (in the thickness direction) along axis 114 and a second through aperture having an orientation along axis 116 that is vertically angled with respect to the horizontal orientation of the first through aperture. The through hole 108, first through aperture and second through aperture each preferably have a matching hexagonal (or other polygonal such as a quadrangle or octagonal) shape that substantially matches the size and hexagonal (polygonal) cross-sectional shape of the roller shaft. It will of course be understood that other shapes, such as a circular or elliptical shape, may alternatively be used.

Thus, it is seen that the axis 116 is off-set from the axis 114 by an angle phi ($\phi$) in the height direction. The orientations of the first and second through apertures are aligned with each other such that the axes 114 and 116 intersect at a point 118 located within the interior of the roller support bracket 96 to define a central through hole portion 120 having a size and shape substantially identical to (if not slightly smaller than) the size and shape of the roller shaft. On one side of the central through hole portion 120 in the thickness direction, the through hole 108 is defined by an upwardly extending aperture having a sloped ceiling 122 and a horizontal floor 124. On the other side of the central through hole portion 120 in the thickness direction, the through hole 108 is defined by a downwardly extending aperture having a horizontal ceiling 126 and a sloped floor 128. In the event that more than one through hole 108 is provided, these through holes are off-set from each other in the height direction. As will be described in more detail herein, these off-set through holes 108 support the installation of tapered rollers or rollers of differing diameters.

Figure 12:
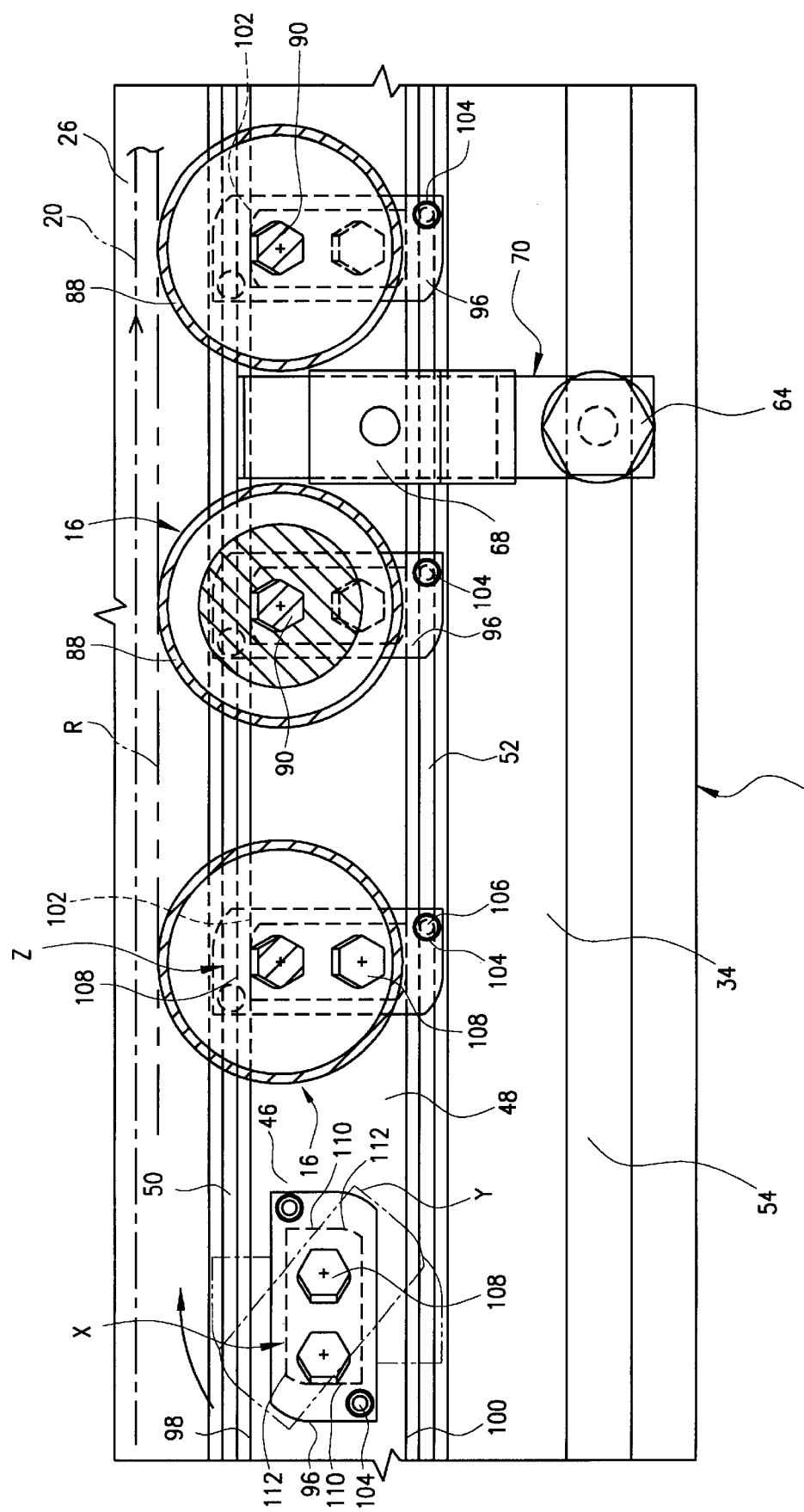
FIG. 12 is a partial longitudinal cross-sectional view of the roller conveyor of FIG. 11 further illustrating rotating installation of the roller shaft support brackets.
Figure 13:
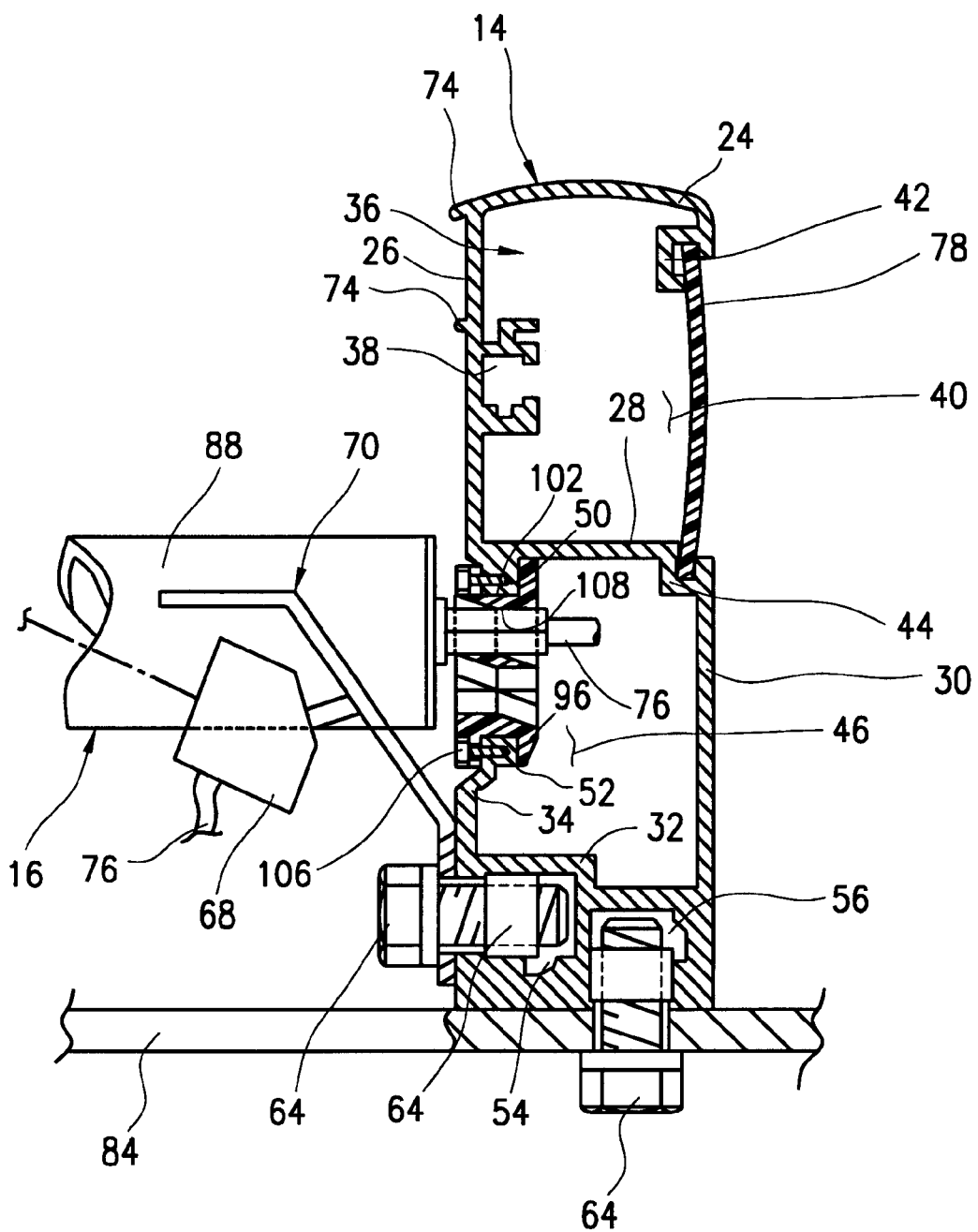
FIG. 13 is a partial lateral cross-sectional view of the roller conveyor of FIG. 11.

With specific reference now to FIG. 12, a description is provided concerning a point of placement rotating installation process for securing the bracket 96 in the side frame 14. First, the bracket 96 is angle (for example, horizontally) inserted into the interior opening 48 for the second duct section 46 at a selected point of placement (as generally indicated at "X"). Next, the bracket 96 is slightly rotated such that the opposed inwardly tapered slot portions 112 of the pair of opposed slots 102 are aligned with upper and lower rail members 98 and 100, respectively (as generally indicated at "Y"). Finally, rotation of the bracket 96 is continued to move the opposed slots 102 into engagement with the upper and lower rail members 98 and 100 (as generally indicated at "Z"). In this regard, it is noted that the space made available at the bottom of the opposed slots 102 in the area of the opposed inwardly tapered slot portions 112 allows completion of bracket rotation into a position wherein the upper and lower rail members 98 and 100 are held by the opposed flat slot portions 110 of the slots 102.

Referring now to FIGS. 9 and 12, a description is provided concerning the process for installing a roller 16 into the brackets 96 mounted on each side frame 14. First, the non-spring loaded roller shaft 90 is inserted into the through hole 108 and into the bracket 96 on one side of the roller conveyor. More particularly, this roller shaft 90 is inserted at an angle substantially equal to the angle $\phi$ along the axis 116 and through the second through aperture. Next, the spring loaded roller shaft 90 at the other end of the roller 16 is loaded by pushing in on the shaft. The other end of the roller 16 is then brought down to a more horizontal position, and the spring loaded roller shaft 90 is aligned with through hole 108 of a bracket 96 in the other side of the roller conveyor. This action moves the non-spring loaded roller shaft 90 into position along the axis 114 and through the first through aperture thus pinching the roller shaft in the bracket 96 between the horizontal ceiling 126 and the horizontal floor 124 of the through hole 108. The spring loaded roller shaft 90 is then released and inserted along axis 114 and through the first through aperture of the through hole 108 into the bracket 96 on the other side of the roller conveyor. The spring loaded roller shaft 90 is similarly pinched in the bracket 96 between the horizontal ceiling 126 and the horizontal floor 124 of the through hole 108. This pinching action serves to stably support the roller shaft 90 at each end of the roller 16. Although not specifically described, it will be understood that appropriate positioning and installation of the bands 94 in the grooves 92 of the roller 16 must be performed in coordination with the installation of the roller shafts 90 in the brackets 96.

Figure 14:
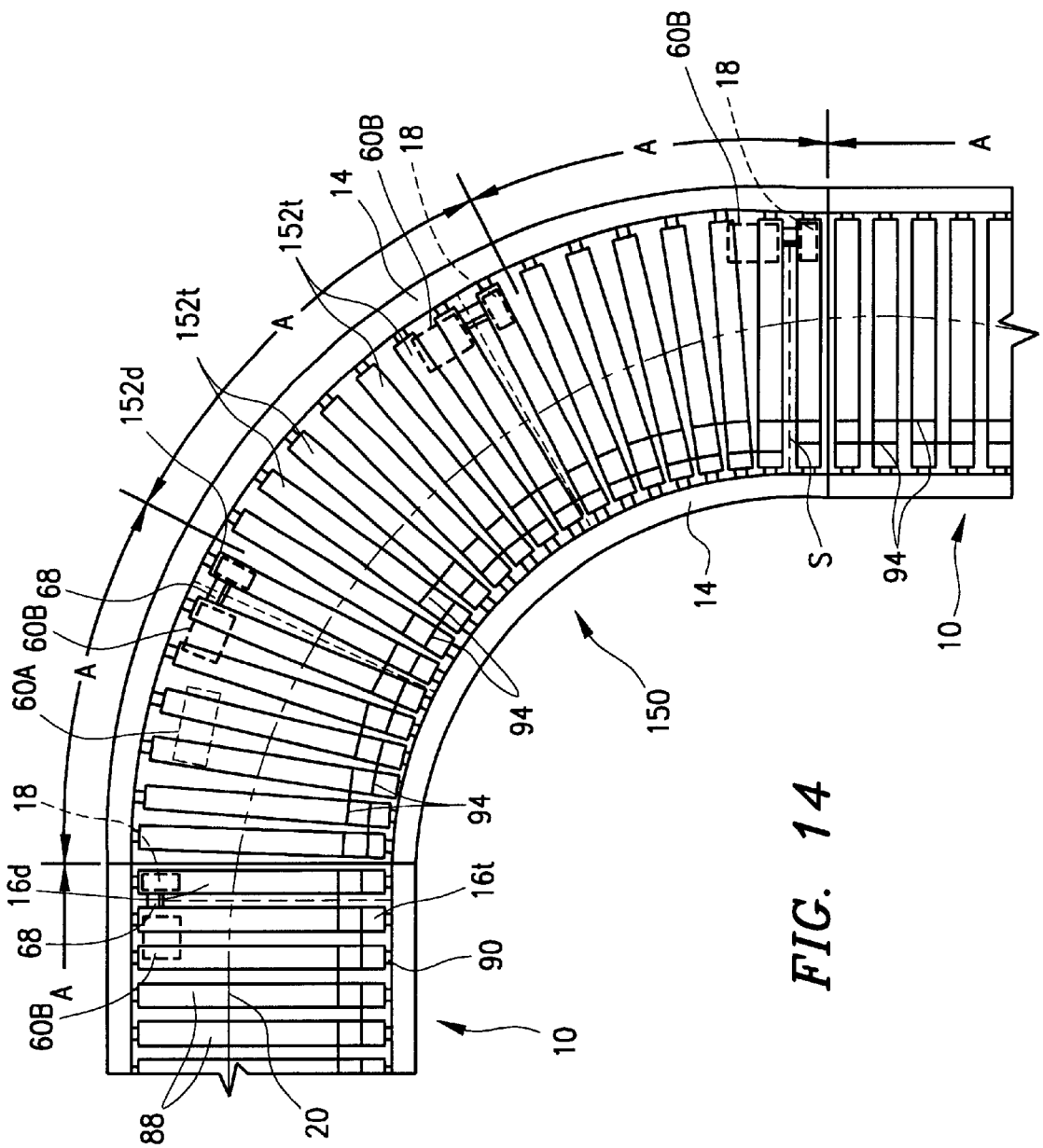
FIG. 14 is a plan view of a curved roller conveyor.
Figure 15:
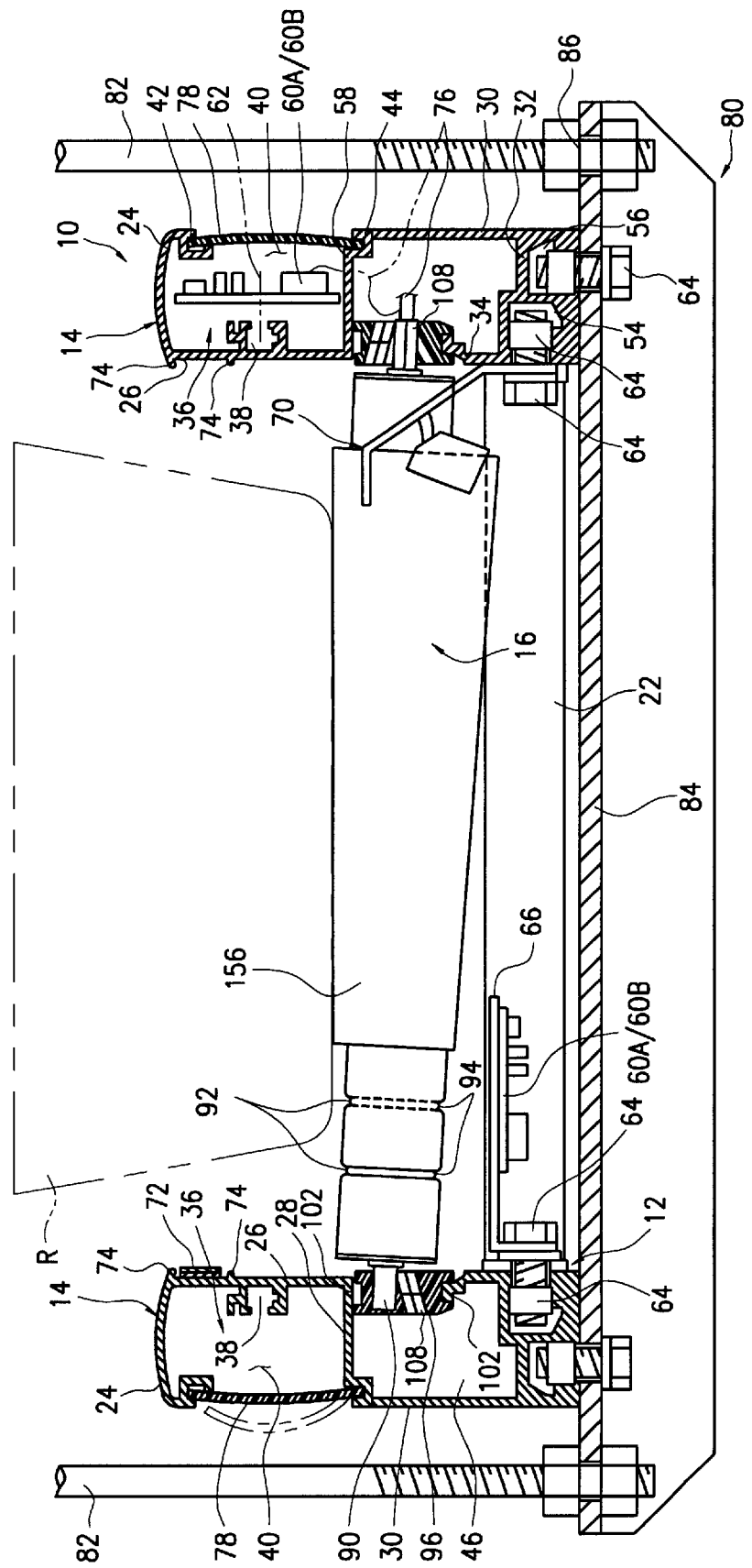
FIG. 15 is a lateral cross-sectional view of the curved roller conveyor of FIG. 13.
Figure 16:
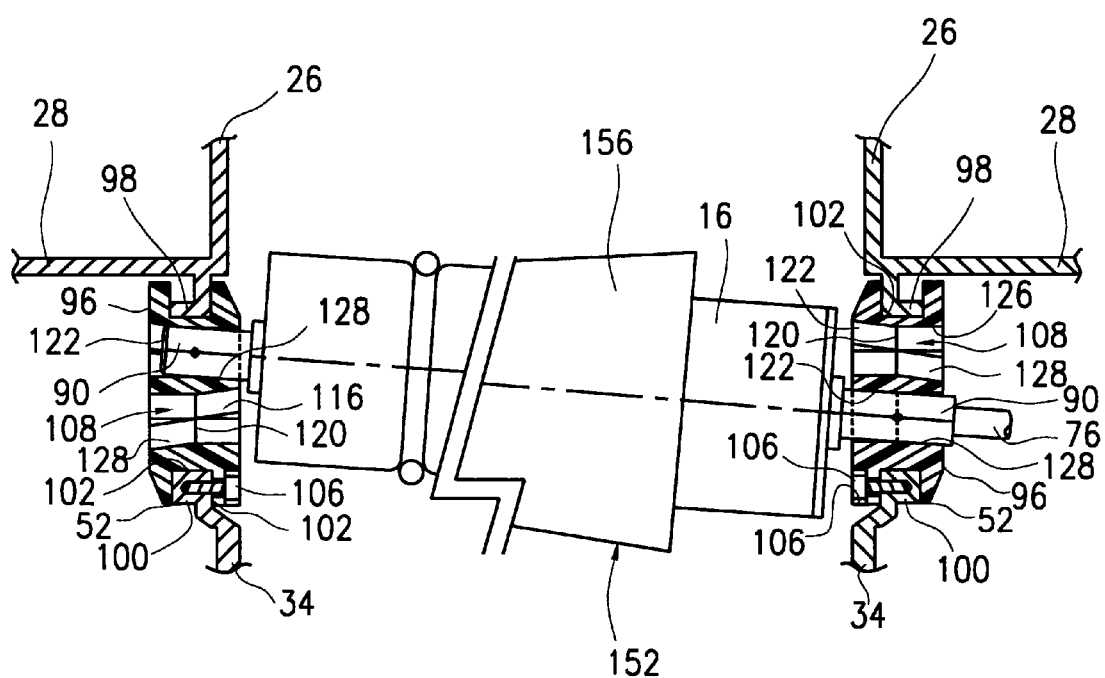
FIG. 16 is a lateral cross-sectional view of the roller conveyor illustrating use of the roller shaft support brackets of FIGS. 7–10 to support the installation of tapered rollers.

Reference is now made to FIGS. 14–16 wherein there are shown several views of a third embodiment of a roller conveyor section 150 in accordance with the present invention. In this third embodiment, the roller conveyor section 150 is curved as opposed to the straight roller conveyor section 10 (also shown in the plan view of FIG. 2). Like reference numerals in FIGS. 14–16 refer to like or similar elements illustrated in FIGS. 1–13 and previously described in detail. Further description of such like or similar elements, except where necessary to explain any new elements illustrated in FIGS. 14–16, will not be provided, and cross-reference to and incorporation of previous descriptions is hereby made.

With respect to the curved roller conveyor section 150, each of the side frames 14 is curved with an appropriately selected radius to provide a properly directed conveyor path 20. Unlike the straight roller conveyor section 10, wherein linear rollers 16 extend between the side frames 14, in the curved roller conveyor section 150 a plurality of tapered rollers 152 (including both tapered drive rollers 152d and tapered transfer rollers 152t) are mounted to the brackets 96 and extend between the side frames. These tapered rollers 152 may be formed by either installing a tapered covering 156 (as shown) over the surface of a linear roller 16, or by providing a tapered roller cylinder 88.

The end of the tapered rollers 152 having a smaller relative diameter is installed at the inner side frame 14 (i.e., that side frame closest to the center of the selected radius for the curve. Preferably, the roller shaft 90 for the tapered roller 152 at the smaller diameter end is inserted into an upper one of the plurality of through holes 108 provided in the bracket 96. The other end of the tapered rollers 152 having a larger relative diameter is installed at the other side frame 14. The roller shaft 90 for the tapered roller 152 at the larger diameter end is inserted into a lower one of the plurality of through holes 108 provided in the bracket. The off-set "d" in the height direction between the upper one of the plurality of through holes 108 and the lower one of the plurality of through holes 108 (see, FIG. 9) is preferably selected to provide level (horizontal) lateral orientation for each tapered roller 152.

Referring now to FIGS. 9 and 16, a description is provided concerning the process for installing a tapered roller 152 into the brackets 96 mounted on each side frame 14. First, the non-spring loaded roller shaft 90 is inserted into the upper through hole 108 and into the bracket 96 on one side of the roller conveyor. More particularly, this roller shaft 90 is inserted at an angle substantially equal to the angle φ along the axis 116 and through the second through aperture. Next, the spring loaded roller shaft 90 at the other end of the roller 152 is loaded by pushing in on the shaft. The other end of the roller 152 is then brought down to past the horizontal position, and the spring loaded roller shaft 90 is aligned with through hole 108 of a bracket 96 in the other side of the roller conveyor. This action moves the non-spring loaded roller shaft 90 into position along the axis 114 and through the first through aperture thus pinching the roller shaft in the bracket 96 between the horizontal ceiling 126 and the horizontal floor 124 of the through hole 108. The spring loaded roller shaft 90 is then released and inserted along angled axis 116 and through the second through aperture of the through hole 108 into the bracket 96 on the other side of the roller conveyor. The spring loaded roller shaft 90 is similarly pinched in the bracket 96, but in this instance is pinched between the sloped ceiling 122 and the sloped floor 128 of the through hole 108. This pinching action on both ends of the roller 152 serves to stably support the roller shaft 90 at each end of the roller. Although not specifically described, it will be understood that appropriate positioning and installation of the bands 94 in the grooves 92 of the roller 152 must be performed in coordination with the installation of the roller shafts 90.

Figure 17:
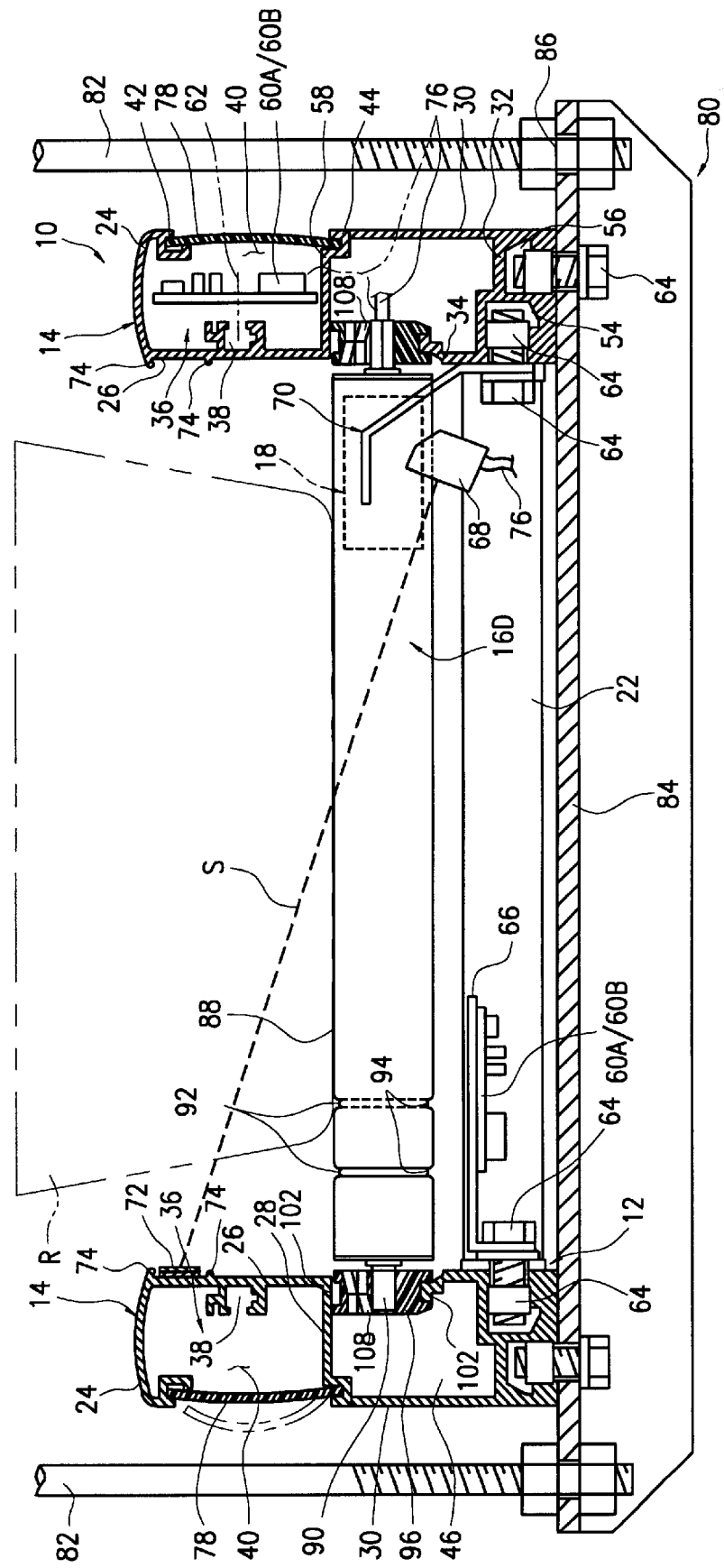
FIG. 17 is a lateral cross-sectional front view of the roller conveyor illustrating use of the roller shaft support brackets of FIGS. 7–10 to support the installation of linear rollers in an alternative implementation.

Reference is now made to FIG. 17 wherein there is shown a lateral cross-sectional view of a fourth embodiment of a roller conveyor section 10 in accordance with the present invention. Like reference numerals in FIG. 17 refer to like or similar elements illustrated in FIGS. 1–16 and previously described in detail. Further description of such like or similar elements, except where necessary to explain any new elements illustrated in FIG. 17, will not be provided, and cross-reference to and incorporation of previous descriptions is hereby made.

In this fourth embodiment, the linear rollers 16 are mounted to the brackets 96 and extend between the side frames 14 of the straight conveyor section 10. More particularly, the roller shafts 90 at each end of the roller 16 are inserted into a lower one of the plurality of through holes 108 provided in each bracket 96. The off-set "d" in the height direction between the upper one of the plurality of through holes 108 and the lower one of the plurality of through holes 108 (see, FIG. 9) for the bracket 96 is preferably selected to either lower the level of the conveyor path 20 (compare to FIG. 11), or facilitate the use of linear rollers 16 having a different (larger) diameter. Installation of such rollers 16 follows the same procedure as previously described with respect to the embodiment of FIG. 11.

Reference is now made to FIGS. 18–20 wherein there are shown cross-sectional views of certain modular frame components 200, 202 and 204 that may be selectively assembled to construct an alternative embodiment for a roller conveyor side frame. These components 200, 202 and 204 are selectively assembled to form a side frame 14 like that shown in FIGS. 1, 4, 5 and 6.

With reference specifically to FIG. 18, a first side frame component 200 is shown. The substantially C-shaped cross-section of the first side frame component 200 is defined by a horizontal roof portion 206 connected to an inner wall portion 208 which extends downward from the inner end of the roof portion 206. The cross-sectional shape of the component 200 is further defined by a horizontal floor portion 210 extending outward from the lower end of the inner wall portion 208 and oriented in parallel with the roof portion 206. A first dovetail groove portion 212 that is downwardly opened is formed in the first component 200 near an outer edge of the horizontal floor portion 210. A second dovetail groove portion 214 that is outwardly opened is formed in the first component 200 on the outer side of the inner wall portion 208. Groove-like locking sections 216 and 218 are formed at the outer ends of the roof portion 206 and floor portion 210, respectively, which portions form an exterior opening 220, in such a way that the groove-like locking sections are opposed to each other. Necessary operating components and associated wiring may be installed (perhaps using the second dovetail groove portion 214) in the duct defined by the exterior opening 220. A cover (not shown) may be mounted between the groove-like locking sections 216 and 218 to enclose the exterior opening 220.

Turning now to FIG. 19, a second side frame component 202 is shown. The substantially C-shaped cross-section of the second side frame component 202 is defined by a horizontal roof portion 222 connected to an outer wall portion 224 which extends downward from the inner end of the roof portion 222. The cross-sectional shape of the component 202 is further defined by a horizontal floor portion 226 extending outward from the lower end of the outer wall portion 224 and oriented in parallel with the roof portion 222. Rails 228 and 230 are formed at the inner edge of the roof portion 222 and the floor portion 226, respectively, which portions form an interior opening 232, in such a way that the rails are opposed to each other. Slit grooves 234 and 236, that are each inwardly opened, are formed in the rails 228 and 230, respectively. Brackets (not shown, see, FIGS. 7–10) may be installed between the rails 228 and 230 and secured to the slit grooves 234 and 236. Openings 238 (such as holes or slots) are formed in the roof portion 222 and the floor portion 226. The opening 238 in the roof portion 222 is aligned with the first dovetail groove portion 212 that is formed in the first component 200 near the outer edge of the horizontal floor portion 210 (see, FIG. 18). The first component 200 may accordingly be secured to the second component 202 by using an appropriate nut and a bolt fastener (not shown) inserted through the opening 238 and mounted in the first dovetail groove portion 212.

With specific reference now to FIG. 20, a third side frame component 204 is shown. The cross-section of the third side frame component 204 is defined by a bar 240 having a number of dovetail grooves formed therein. A first dovetail groove portion 242 that is downwardly opened is formed in the third component 204 near an outer edge of the bar 240. The third component 204, and hence any side frame 14 constructed therefrom, may be secured to a supporting frame (not shown, see FIG. 1) by using an appropriate nut and a bolt fastener (not shown) mounted in the first dovetail groove portion 242. A second dovetail groove portion 244 that is inwardly opened is formed in the third component 204 near an inner edge of the bar 240. The third component 204, and hence any side frame 14 constructed therefrom, may be secured through a lower frame (not shown, see, FIG. 1) to another side frame by using an appropriate nut and a bolt fastener (not shown) mounted in the second dovetail groove portion 244. A third dovetail groove portion 246 that is upwardly opened is formed in the third component 204 near an upper edge of the bar 240. The third dovetail groove portion 246 is aligned with the opening 238 in the floor portion 226 that is formed in the second component 202 near the outer edge of the horizontal floor portion 226 (see, FIG. 19). The second component 202 may accordingly be secured to the third component 204 by using an appropriate nut and a bolt fastener (not shown) inserted through the opening 238 and mounted in the third dovetail groove portion 246. As a further alternative, an opening 248 (such as holes or slots) is formed in the roof portion 206 of the component 200 (see, FIG. 18), with the opening 248 aligned with the third dovetail groove portion 246. The first component 200 may accordingly be secured to the third component 204 by using an appropriate nut and a bolt fastener (not shown) inserted through the opening 248 and mounted in the third dovetail groove portion 246. Such a configuration could effectuate a swapping of the vertical positioning of the first component and second component 202.

During assembly and installation of the conveyor, not only selected ones of the components connected to form side frames, but also the side frames themselves must assembled together end to end and arranged in such a way that the conveyor path is longitudinally extended. Adjacent roller conveyer sections are coupled together by coupling plates (not shown) which are secured across the joints between adjacent side frames 14 using an appropriate nut and a bolt fastener which secures the coupling plates to the side frames 14 at any one or more of the included dovetail groove portions 212, 214, 242, 244 and/or 246 of the components 200, 202 and 204.

One advantage of modularizing the components 200, 202 and 204 that form the side frame 14 is that when the functionality provided by the component is not needed, the component need not be included. An example of this might comprise a situation where no external opening 220 duct is needed to enclose wiring or components, the first component is not used. Savings in cost and weight are thus made by selective inclusion of only necessary components when forming the side frame. Another advantage of modularizing the components 200, 202 and 204 that form the side frame 14 is that when the component interferes with operation or configuration of the roller conveyer, the component need not be included. An example of this might comprise diverter sections of the roller conveyor where the presence of the component 200 would prevent transferred articles from being horizontally slid off the conveyor path, that component could be excluded. Savings in cost and weight are thus made by selective inclusion of only necessary components 200, 202 and 204 when forming the side frame. Another advantage of modularizing the components is a potential reduction in costs as the S-shaped side frame of FIG. 1 may be more expensive to tool, extrude and/or produce than the individual components. Another advantage of modularizing the components is a potential reduction in costs to form a curved roller conveyor section 150 (see, FIG. 14) because the smaller cross sections of components 200, 202 and 204 are easier to bend than the S-shaped side frame of FIG. 15.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A roller conveyor, comprising:

a pair of longitudinally extending side frames, each side frame having a substantially S-shaped cross-section defining a first duct section having an exterior opening and a second duct section having an interior opening defined by a longitudinally extending pair of opposed rails;

a cover removably mounted to the side frame at the first duct section for enclosing the exterior opening;

a plurality of support brackets each removably mounted between the opposed rails of the side frame at the interior opening of the second duct section, wherein each support bracket includes at least one through hole, and wherein each support bracket is individually mountable without need for disturbing adjacently mounted support brackets on either side; and a plurality of conveyor rollers laterally mounted between the support brackets mounted to the pair of side frames, each conveyor roller including a roller shaft at each end thereof, the roller shafts inserted through one of the through holes in the support bracket.

2. The roller conveyor as in claim 1 wherein:

the S-shaped side frame includes a plate portion separating the first duct section from the second duct section; and the separating plate portion includes an opening therein for allowing wiring to pass between the first and second duct sections.

3. The roller conveyor as in claim 1 further including:

drive means internally mounted within a certain drive one of the plurality of rollers for actuating that roller; and a band rotatably interconnecting between adjacent ones of each of the plurality of rollers to transfer actuation from the certain drive one of the plurality of rollers to the remaining ones of the plurality of rollers.

4. The roller conveyor as in claim 1 further including a controller for controlling actuation of the plurality of rollers in response to an article sensor signal to transport conveyed articles along a transport path defined by the plurality of rollers.

5. The roller conveyor as in claim 4 wherein the controller is installed within the first duct section.

6. The roller conveyor as in claim 4 wherein the controller is mounted to the side frame underneath the plurality of rollers.

7. The roller conveyor as in claim 4 further including an article sensor for sensing the presence of articles in the transport path and send the article sensor signal indicative thereof to the controller.

8. The roller conveyor as in claim 7 wherein the article sensor comprises:

a photosensor mounted to one of the side frames underneath the plurality of rollers, the photosensor projecting a beam of light up between adjacent rollers and detecting a reflection of that beam of light; and a reflector mounted to another one of the side frames in the path of the beam of light to reflect the beam of light back to the photosensor.

9. The roller conveyor as in claim 8 wherein the reflector comprises a corner-type reflector.

10. The roller conveyor as in claim 8 wherein the reflector is mounted on a vertical surface of the another one of the side frames, and wherein the side frame includes a longitudinally extending ridge for protecting the reflector from damage due to contact with articles being conveyed along a transport path defined by the plurality of rollers.

11. The roller conveyor as in claim 1 wherein each side frame includes at least one longitudinally extending dovetail groove used for joining adjacent side frames.

12. A roller conveyor roller shaft support bracket, comprising:

a bracket member having a top and bottom edge and including an opposed pair of slots formed in the top and bottom edges of the bracket member for mounting to a frame assembly, each of the opposed slots defined by a pair of opposed first flat slot portions contiguous with a pair of opposed second slot portions that are inwardly tapered towards a center of the bracket member; and at least one roller shaft supporting through hole extending through the bracket member near its center in a direction perpendicular to the top and bottom edges.

13. The bracket of claim 12 wherein the first through aperture and second through aperture each have a hexagonal shape.

14. The bracket of claim 12 wherein the second axis is angled away from the first axis in a direction toward an edge of the bracket member.

15. The bracket of claim 12 wherein the roller shaft supporting through hole on one side of the central through hole portion is defined by a generally upwardly extending aperture having a sloped ceiling and a substantially horizontal floor, and wherein the roller shaft supporting through hole on an opposite side of the central through hole portion is defined by a generally downwardly extending aperture having a substantially horizontal ceiling and a sloped floor.

16. A roller conveyor roller shaft support bracket, comprising:

a bracket member having a top and bottom edge and including means at the top and bottom edge for allowing the bracket to be individually mounted to a frame assembly; and at least one roller shaft supporting through hole extending through the bracket member near its center in a direction perpendicular to the top and bottom edges, wherein the roller shaft supporting through hole is defined by a first through aperture oriented along a first axis and a second through aperture oriented along a second axis that is angled away from the first axis, wherein the first and second axes intersect near the center of the bracket member to define a central through hole portion having a size and shape substantially identical to a size and shape of the roller shaft.

17. The bracket of claim 16 wherein the means for allowing comprises:

an opposed pair of slots formed in the top and bottom edges of the bracket member for mounting to the frame assembly, each of the opposed slots defined by a pair of opposed first flat slot portions contiguous with a pair of opposed second slot portions that are inwardly tapered towards a center of the bracket member.

18. The bracket of claim 16 wherein the second axis is angled away from the first axis in a direction toward the top edge of the bracket member.

19. The bracket of claim 16 wherein the roller shaft supporting through hole on one side of the central through hole portion is defined by a generally upwardly extending aperture having a sloped ceiling and a substantially horizontal floor, and wherein the roller shaft supporting through hole on an opposite side of the central through hole portion is defined by a generally downwardly extending aperture having a substantially horizontal ceiling and a sloped floor.

* * * * *